US009641617B2

(12) United States Patent
Saxena et al.

(10) Patent No.: US 9,641,617 B2
(45) Date of Patent: May 2, 2017

(54) SYSTEM AND METHOD FOR VERIFYING INTEGRITY OF CLOUD DATA USING UNCONNECTED TRUSTED DEVICE

(71) Applicant: Infosys Limited, Bangalore (IN)

(72) Inventors: Ashutosh Saxena, Hyderabad (IN); Nitin Singh Chauhan, Nimach (IN); Sravan Kumar Rondla, Hyderabad (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/561,992

(22) Filed: Dec. 5, 2014

(65) Prior Publication Data

US 2015/0180835 A1 Jun. 25, 2015

(30) Foreign Application Priority Data

Dec. 20, 2013 (IN) .......................... 5992/CHE/2013

(51) Int. Cl.
*H04L 29/06* (2006.01)
*H04L 29/08* (2006.01)
*G06F 21/34* (2013.01)
*G06F 21/62* (2013.01)

(52) U.S. Cl.
CPC .......... *H04L 67/1097* (2013.01); *G06F 21/34* (2013.01); *G06F 21/6236* (2013.01); *H04L 63/123* (2013.01)

(58) Field of Classification Search
CPC ..... H04L 29/06; H04L 29/08; H04L 63/0428; H04L 67/1097; H04L 63/123; G06F 21/34; G06F 21/6236
See application file for complete search history.

(56) References Cited

U.S. PATENT DOCUMENTS

| 6,996,712 B1 | 2/2006 | Perlman et al. |
| 9,171,162 B2 * | 10/2015 | Malkhasyan ........... G06F 11/00 |
| 2010/0211781 A1 | 8/2010 | Auradkar et al. |
| 2010/0268692 A1 * | 10/2010 | Resch ................. G06F 11/1044 |
| | | 707/687 |
| 2010/0268938 A1 | 10/2010 | Resch |
| 2010/0306076 A1 | 12/2010 | Taveau et al. |

(Continued)

OTHER PUBLICATIONS

Sravan Kumar, R., and Ashutosh Saxena. "Data integrity proofs in cloud storage." Communication Systems and Networks (COMSNETS), 2011 Third International Conference on. IEEE, 2011.*

(Continued)

*Primary Examiner* — Chau Le
*Assistant Examiner* — Muhammad Chaudhry
(74) *Attorney, Agent, or Firm* — LeClairRyan, a Professional Corporation

(57) ABSTRACT

The present invention provides a method and system for verifying integrity of cloud data using unconnected trusted device. The method involves requesting encrypted data though a terminal from a metadata offsite location on a cloud storage then entering encrypted data into an unconnected trusted device thereafter obtaining sentinel data from one or more predefined sentinel locations in encrypted data then requesting original data from the cloud storage through the terminal from the unconnected trusted device thereafter comparing sentinel data and original data for integrity and finally displaying the results.

3 Claims, 3 Drawing Sheets

(56) References Cited

U.S. PATENT DOCUMENTS

| | | | |
|---|---|---|---|
| 2010/0332479 A1 | 12/2010 | Prahlad et al. | |
| 2010/0332818 A1* | 12/2010 | Prahlad | G06F 17/3002 |
| | | | 713/150 |
| 2011/0093567 A1 | 4/2011 | Jeon et al. | |
| 2011/0145593 A1 | 6/2011 | Auradkar et al. | |
| 2011/0153812 A1 | 6/2011 | Yoon et al. | |
| 2011/0167221 A1 | 7/2011 | Pangal et al. | |
| 2011/0225451 A1 | 9/2011 | Leggette et al. | |
| 2011/0225640 A1 | 9/2011 | Ganapathy et al. | |
| 2011/0246433 A1 | 10/2011 | Sun | |
| 2011/0264906 A1 | 10/2011 | Pourzandi et al. | |
| 2012/0166576 A1 | 6/2012 | Orsini et al. | |
| 2012/0266000 A1* | 10/2012 | Maheshwari | G06F 21/6218 |
| | | | 713/189 |
| 2012/0311691 A1* | 12/2012 | Karlin | H04L 63/0236 |
| | | | 726/12 |
| 2013/0058477 A1* | 3/2013 | Kobayashi | G06F 21/72 |
| | | | 380/28 |
| 2014/0173730 A1* | 6/2014 | Bejerasco | G06F 21/50 |
| | | | 726/22 |
| 2014/0380036 A1* | 12/2014 | Neumann | H04L 63/062 |
| | | | 713/150 |
| 2015/0113518 A1* | 4/2015 | Liem | G06F 21/57 |
| | | | 7/171 |
| 2015/0288703 A1* | 10/2015 | Yoshino | H04L 9/3242 |
| | | | 726/4 |

OTHER PUBLICATIONS

Wang, Boyang, Baochun Li, and Hui Li. "Knox: privacy-preserving auditing for shared data with large groups in the cloud." Applied Cryptography and Network Security. Springer Berlin Heidelberg, 2012.*

* cited by examiner

SYSTEM AND METHOD FOR VERIFYING INTEGRITY OF CLOUD DATA USING UNCONNECTED TRUSTED DEVICE

This application claims the benefit of Indian Patent Application Serial No. 5992/CHE/2013 filed Dec. 20, 2013, which is hereby incorporated by reference in its entirety.

FIELD

The present invention relates generally to verifying the integrity of cloud data and more particularly, a method and system for verifying integrity of cloud data using an unconnected trusted device.

BACKGROUND

Cloud computing has emerged as a great advantage to enterprise and individual users dealing with large data size. There is significant cost associated with data storage and considering the rapid rate at which data is getting generated, users are finding it more cost effective to push data to cloud storage services. However, security is a major concern for cloud users because control boundaries are moving towards cloud provider. In such scenario, cloud consumers desire more mechanisms to get assurance about security of their data stored with cloud provider. There are opportunities of data integrity violation due to malicious intent or lack of controls within cloud provider environment.

Many companies in cloud market are providing cost-effective and scalable file storage in the cloud. However verifying integrity of data stored with third party still remains challenge for cloud user community. There are various technical and operational issues which can compromise integrity of customer data in cloud. SLA's and contracts do not provide technical, efficient and verifiable method to find the integrity status of data hosted in cloud provider environment.

There are some tools available with cloud provider which checks the integrity of data over a period but their usage are limited to cloud provider and such tools many times do not provide option for cloud customer or user to verify independently the integrity of data. The tools and processes used at cloud provider side usually perform integrity check independent of requirement of particular user and data. Some available tools for data integrity verification of storage tapes might perform the verification for entire data block set or tape. Cloud customer/user might be only interested in verifying integrity of their data only instead of complete data storage. Most of the data integrity verification techniques require cryptographic operation for verification to be performed by device with significant computation capability. In a scenario where multiple cloud users use such machine, it cannot be considered as trusted or personalized device.

In view of foregoing discussion there is a need for providing a mechanism to cloud customer for verifying integrity of cloud data using unconnected trusted device.

SUMMARY

The present invention overcomes the limitation mentioned above by providing a mechanism to cloud customers for verifying the integrity of their data stored at third party cloud provider company using unconnected trusted device like mobile gadgets (phones, watch, tablet etc.).

According to the present embodiment, a method for verifying integrity of cloud data using unconnected trusted device is disclosed. The method involves requesting encrypted data through a terminal from a metadata offsite location on a cloud storage then entering encrypted data into an unconnected trusted device thereafter obtaining sentinel data from one or more predefined sentinel locations in encrypted data after decrypting through a user personalized key stored on the unconnected trusted device then requesting original data from the cloud storage through the terminal from the unconnected trusted device and finally comparing sentinel data and original data for integrity.

In an additional embodiment, a system for verifying integrity of cloud data using an unconnected trusted device is disclosed. The system includes an encrypted data request component, an encrypted data entering component, a sentinel data obtaining component, an original data request component and a data comparison component. The encrypted data request component is configured to request encrypted data though a terminal from a metadata offsite location on a cloud storage. The encrypted data entering component is configured to enter encrypted data into an unconnected trusted device. The sentinel data obtaining component is configured to obtain sentinel data from one or more predefined sentinel locations in the encrypted data after decrypting through a user personalized key stored on the unconnected trusted device. The original data request component is configured to request original data from the cloud storage through the terminal from the unconnected trusted device. The data comparison component is configured to compare sentinel data and original data for integrity.

In another embodiment, a non-transitory computer readable medium for verifying integrity of cloud data using unconnected trusted device is disclosed. This involves a non-transitory computer readable medium having stored thereon instructions verifying integrity of cloud data using unconnected trusted device. The computer program code is adapted to requesting encrypted data though a terminal from a metadata offsite location on a cloud storage then entering encrypted data into an unconnected trusted device thereafter obtaining sentinel data from one or more predefined sentinel locations in encrypted data after decrypting through a user personalized key stored on the unconnected trusted device then requesting original data from the cloud storage through the terminal from the unconnected trusted device and finally comparing sentinel data and original data for integrity.

BRIEF DESCRIPTION OF THE DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
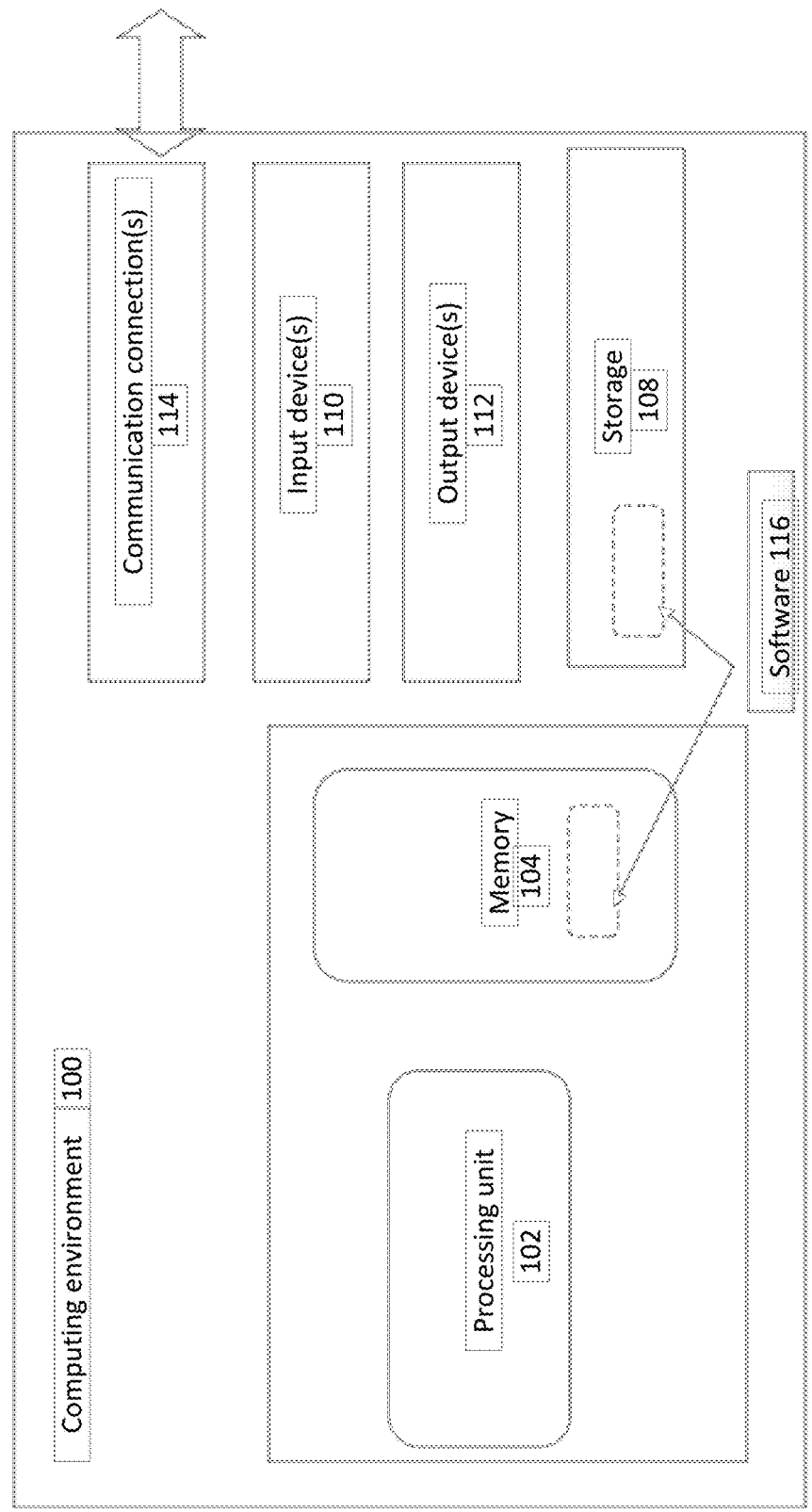
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, mini-computers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
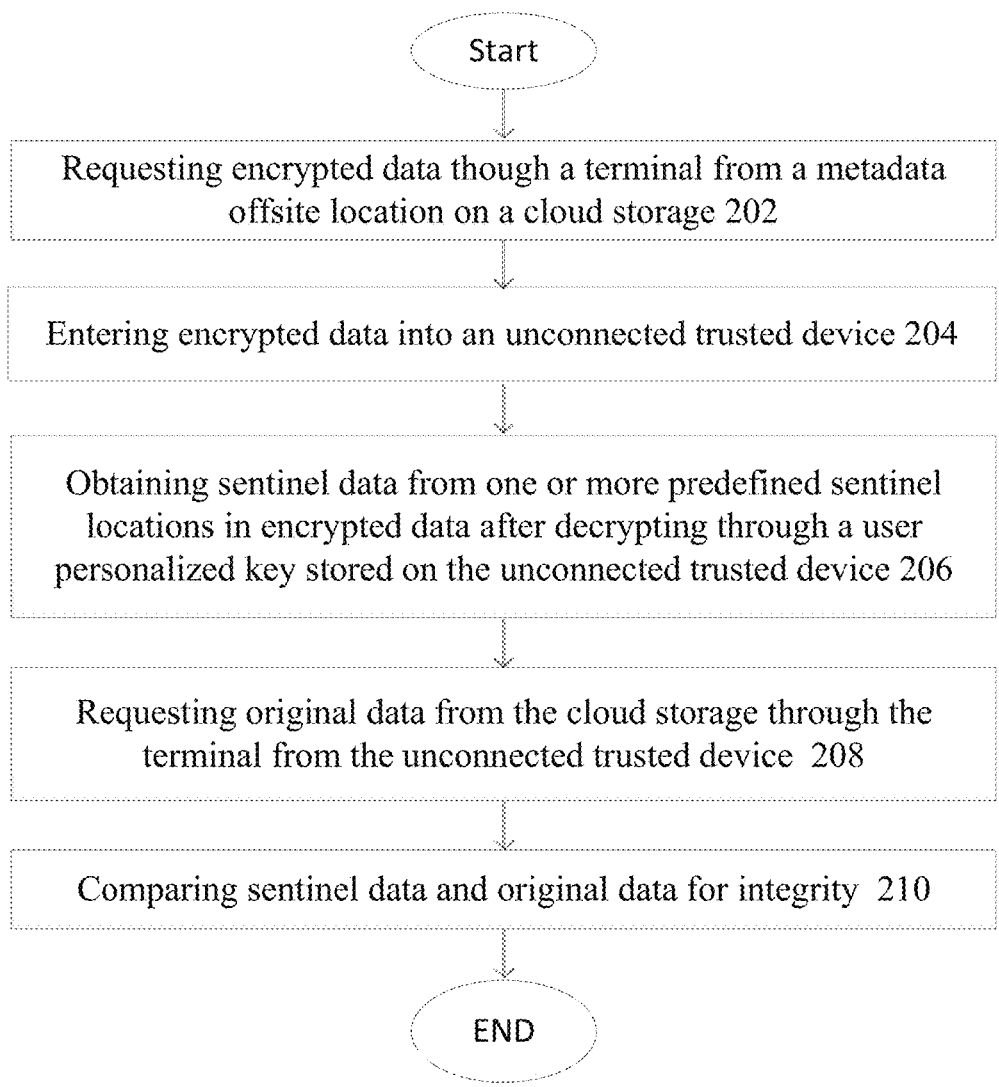
FIG. 2 is a flowchart, illustrating a method for verifying integrity of cloud data using unconnected trusted device, in accordance with an embodiment of the present technique.

FIG. 2 is a flowchart, illustrating a method for verifying integrity of cloud data using unconnected trusted device. An encrypted data is requested through a terminal from a metadata offsite location on a cloud storage 202 then data is entered into an unconnected trusted device 204 thereafter sentinel data is obtained from one or more predefined sentinel locations in encrypted data after decrypting through a user personalized key stored on the unconnected trusted device 206 then original data is requested from the cloud storage through the terminal from the unconnected trusted device 208 and finally comparing sentinel data and original data for integrity 210. The result of data integrity is displayed on the unconnected trusted device. The cloud storage provides an interface to cloud customer for uploading data and data is converted to the encrypted data wherein the encrypted data is metadata created by identifying the sentinel location within the original data and by encrypting sentinel location and sentinel data together by user personalized key.

Figure 3:
FIG. 3 is a block diagram illustrating a system for verifying integrity of cloud data using unconnected trusted device, in accordance with an embodiment of the present technique.

FIG. 3 is a block diagram illustrating a system for verifying integrity of cloud data using unconnected trusted device, in accordance with an embodiment of the present technique. More particularly system includes a an encrypted data request component 302, an encrypted data entering component 304, a sentinel data obtaining component 306, an original data request component 308 and a data comparison component 310. The encrypted data request component is configured to request encrypted data though a terminal from a metadata offsite location on a cloud storage. The encrypted data entering component is configured to enter encrypted data into an unconnected trusted device. The sentinel data obtaining component is configured to obtain sentinel data from one or more predefined sentinel locations in the encrypted data after decrypting through a user personalized key stored on the unconnected trusted device. The original data request component is configured to request original data from the cloud storage through the terminal from the unconnected trusted device. The data comparison component is configured to compare sentinel data and original data for integrity.

The trusted unconnected devices are handheld mobile devices not limited to mobile phones, tablets, PDAs etc.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for verifying integrity of cloud data, the method comprising:
   requesting, by a computing device, encrypted data through a terminal from a metadata offsite location on a cloud storage, the encrypted data is associated with original data that comprises a subset of the cloud data for a user that was uploaded and stored in the cloud storage;
   receiving, by the computing device, the encrypted data, wherein the encrypted data is metadata obtained by identifying one or more sentinel locations within the original data that comprises the subset of the cloud data and encrypting the one or more sentinel locations and sentinel data by a user personalized key;
   obtaining, by the computing, the sentinel data from one or more predefined sentinel locations in the encrypted data after decrypting through a user personalized key that is stored by the computing device;

requesting, by the computing device, the original data that comprises the subset of the cloud data from the cloud storage through the terminal;

comparing, by the computing device, the sentinel data and the original data to verify integrity of the original data in the cloud storage; and displaying, by the computing device, a result of data integrity based on the comparing.

2. A computing device comprising:

a processor;

a memory coupled to the processor which is configured to execute programmed instructions stored in the memory to:

request encrypted data through a terminal from a metadata offsite location on a cloud storage, the encrypted data is associated with original data that comprises a subset of cloud data for a user that was uploaded and stored in the cloud storage;

receive the encrypted data, wherein the encrypted data is metadata obtained by identifying one or more sentinel locations within the original data that comprises the subset of the cloud data and by encrypting the one or more sentinel locations and sentinel data by a user personalized key;

obtain sentinel data from one or more predefined sentinel locations in the encrypted data after decrypting through a user personalized key that is stored by the computing device;

request the original data from the cloud storage through the terminal;

compare the sentinel data and the original data to verify integrity of the original data in the cloud storage; and display a result of data integrity based on the comparison.

3. A non-transitory computer readable medium having stored thereon instructions for verifying integrity of cloud data comprising machine executable code which when executed by at least one processor, causes the at least one processor to perform steps comprising:

requesting encrypted data through a terminal from a metadata offsite location on a cloud storage, the encrypted data is associated with original data that comprises a subset of the cloud data for a user that was uploaded and stored in the cloud storage;

receiving the encrypted data wherein the encrypted data is metadata obtained by identifying one or more sentinel locations within original data that comprises the subset of the cloud data and by encrypting the one or more sentinel locations and sentinel data by a user personalized key;

obtaining sentinel data from one or more predefined sentinel locations in the encrypted data after decrypting through a user personalized key that is stored by a computing device making the request;

requesting original data from the cloud storage through the terminal;

comparing the sentinel data and the original data to verify integrity of the original data in the cloud storage; and displaying a result of data integrity based on the comparing.

* * * * *